(12) United States Patent
Wang

(10) Patent No.: US 7,054,304 B2
(45) Date of Patent: May 30, 2006

(54) METHOD AND PROTOCOL FOR MANAGING BROADBAND IP SERVICES IN A LAYER TWO BROADCAST NETWORK

(75) Inventor: Yunsen Wang, Saratoga, CA (US)

(73) Assignee: Terited International, Inc., Saratoga, CA (US)

( * ) Notice: Subject to any disclaimer, the term of this patent is extended or adjusted under 35 U.S.C. 154(b) by 799 days.

(21) Appl. No.: 09/764,462

(22) Filed: Jan. 19, 2001

(65) Prior Publication Data
US 2002/0159463 A1    Oct. 31, 2002

(51) Int. Cl.
H04L 12/66 (2006.01)
H04L 12/28 (2006.01)
H04L 12/54 (2006.01)
G06F 15/173 (2006.01)

(52) U.S. Cl. .................. 370/352; 370/428; 370/396; 370/390; 709/223

(58) Field of Classification Search ............ 370/229, 370/230, 235, 230.1, 231, 389, 400, 351, 370/390, 395.54, 401; 709/203, 219, 220, 709/223, 224, 231, 235, 238, 242, 105, 202, 709/241
See application file for complete search history.

(56) References Cited

U.S. PATENT DOCUMENTS

| | | | |
|---|---|---|---|
| 5,854,897 A * | 12/1998 | Radziewicz et al. | 709/224 |
| 6,052,718 A * | 4/2000 | Gifford | 709/219 |
| 6,195,694 B1 * | 2/2001 | Chen et al. | 709/220 |
| 6,622,157 B1 * | 9/2003 | Heddaya et al. | 709/202 |
| 6,625,578 B1 * | 9/2003 | Spaur et al. | 705/14 |
| 6,640,243 B1 * | 10/2003 | Phillips et al. | 709/206 |
| 6,661,799 B1 * | 12/2003 | Molitor | 370/401 |
| 6,708,218 B1 * | 3/2004 | Ellington et al. | 709/236 |

* cited by examiner

*Primary Examiner*—Hanh Nguyen
(74) *Attorney, Agent, or Firm*—Bacon & Thomas, PLLC

(57) ABSTRACT

A method and system for managing broadband IP servers in a layer two broadcast network includes an intermediate system, an end system, and a control system. The service information is advertised by each end system (server) on the layer two network. The same service is provided by multiple end systems. The intermediate system forwards a service request packet to one of the available end systems, and the intermediate system learns the service advertisements from the end system. If the available end system decides to instruct an intermediate system to forward certain traffic from a certain source to the end system, the end system can advertise the flow information to intermediate systems. This flow could be an established TCP connection or any packets that are specified by pattern matching rules. The intermediate system always forwards the packet based on the flow that is advertised by the end system.

15 Claims, 14 Drawing Sheets layer two data center network
ES: End System
IS: Intermediate System
SS: Supervisor System
BSS: Backup Supervisor System
RS: Radius Server used for Authentication, Authorization, and Accounting (AAA)

layer two data center network
ES: End System
IS: Intermediate System
SS: Control System
BSS: Backup Supervisor System
RS: Radius Server used for Authentication, Authorization, and Accounting (AAA)

FIG. 2(a)

Service registration request
$\longrightarrow$

Service registration acknowledge
$\longleftarrow$

Keep-alive message
$\longrightarrow$

End system register its service from Control system

FIG. 2(b)

Service de-registration request
$\longrightarrow$

Service de-registration acknowledge
$\longleftarrow$

End system de-register its service from Control system

Control system sends update about new end systems (servers)

Service delete update (seq n)
←—————————————————————
Service delete update acknowledge (seq n, from IS1)
—————————————————————→
Service delete update acknowledge (seq n, from IS2)
—————————————————————→
...

Service delete update (seq n+1)
←—————————————————————
Service delete update acknowledge (seq n+1, from IS1)
—————————————————————→
Service delete update acknowledge (seq n+1 from IS2)
—————————————————————→
...

Control system sends update about deleted end systems (servers)

New intermediate system (possible an end system too) retrieve the server list for a specific type of service

FIG. 4(a)
Service congestion message (multicast)
Multicast service control (congestion) message
FIG. 4(b)
User request received by the server
Service congestion message (unicast)
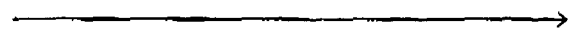
Triggered unicast service control (congestion) message
FIG. 4(c)
Packet received by the router (IS)
Service redirect message
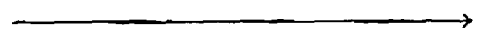
Service control (congestion) message sent by router

FIG. 5
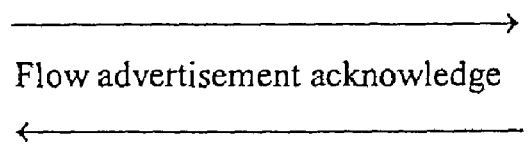
Flow advertised by an end system
FIG. 6
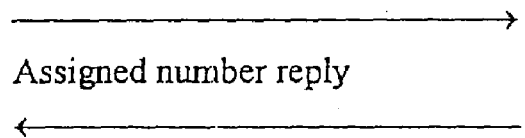
Request number(s) from centrally controlled number server (CS)

New back up control system to retrieve the assigned number list from Primary control system

FIG. 8

| Label value, 20 bits | Experimental Use, 3 bits | Bottom of stack, 1 bit | Time To Live, 8 bits |
|---|---|---|---| label encapsulation in user packet

FIG. 9

| DMAC | SMAC | 16 bit Flow frame type | 32 bit Flow label | Frame type | Data |
|---|---|---|---|---|---|

| DMAC | SMAC | 16 bit Source frame type | 32 bit Source label | Frame type | Data |
|---|---|---|---|---|---|

| DMAC | SMAC | 16 bit VLAN frame type | 16 bit VLAN 0 & priority | Flow frame type | 32 bit flow label | Frame type | Data |
|---|---|---|---|---|---|---|---|

| DMAC | SMAC | VLAN frame type | VLAN 0 & priority | Source frame type | 32 bit source label | Frame type | Data |
|---|---|---|---|---|---|---|---|

Frame formats with or without VLAN priority

FIG. 10

| DMAC | SMAC | Type | Message |
|---|---|---|---|

| IP header | Message |
|---|---|

| UDP header | Message |
|---|---| protocol message format

FIG. 11

| 2 byte Message Type | 2 byte Message length | Message |
|---|---|---| common message header format

FIG. 12

| Server Address | Service type matching rule | 4 byte Number of Service attributes | Service attributes (keep-alive etc.) | Service type matching rule | ... |
|---|---|---|---|---|---| message format for service registration request

FIG. 13

| Server Address | 4 byte Service type | 4 byte Service type | 4 byte Service type | ... |
|---|---|---|---|---| message format for service de-registration request

FIG. 14

| 4 byte Service type | Group Addresses | 4 byte precedence | 4 byte Service type | Group Addresses | ... |
|---|---|---|---|---|---|

| Server Unicast Address | Server Multicast Address | Client Multicast Address |
|---|---|---| message format for service registration acknowledge

FIG. 15

| 4 byte Service type | Server Address | 4 byte Service type | Server Address | ... |
|---|---|---|---|---| message format for service de-registration acknowledge service type matching rule message format message format for service update request message format for service addition update Message format for service delete update message format for service update acknowledgement message format for service control advertisement message format for flow advertisement

FIG. 23

| Flow label | 4 byte Number of flow attributes | Flow Attributes | Flow label | 4 byte Number of flow attributes | Flow Attributes | Flow label | ... |
|---|---|---|---|---|---|---|---| message format for flow advertisement acknowledgement

FIG. 24

| 2 byte flow Attribute type | 2 byte Attribute length | Variable length Attribute value |
|---|---|---| message format for flow attribute

FIG. 25

| 4 byte total number of number types | 2 byte Number type | 2 byte Length | Values | 2 byte Number type | ... |
|---|---|---|---|---|---|

Message format for Assigned Number Request

FIG. 26

| 4 byte total number of number types | 2 byte Number type | 2 byte Length | Values | 2 byte Number type | ... |
|---|---|---|---|---|---|

Message format for Assigned Number Acknowledgement

FIG. 27

| 4 byte total number of number types | 2 byte Number type | 2 byte Number type | 2 byte Number type | 2 byte Number type | ... |
|---|---|---|---|---|---|

Message format for Assigned Number Update Request

FIG. 28

| 4 byte Sequence number | 4 byte total number of number types | 2 byte Number type | 2 byte Length | Values | 2 byte Number type | 2 byte Length | ... |
|---|---|---|---|---|---|---|---|

Message format for Assigned Number Update

FIG. 29

| 4 byte Sequence number | 4 byte total number of number types | 2 byte Number type | 2 byte Length | Values | 2 byte Number type | 2 byte Length | ... |
|---|---|---|---|---|---|---|---|

Message format for Assigned Number Update Acknowledgement

METHOD AND PROTOCOL FOR MANAGING BROADBAND IP SERVICES IN A LAYER TWO BROADCAST NETWORK

FIELD OF THE INVENTION

The present invention relates to a load balancing fault tolerant scalable IP broadband service management protocol that relates to flow oriented switching and, more particularly, to a method and protocol for managing large number servers that provide broadband IP services in a layer 2 broadcast network by advertising and directing service from intermediate system to any available end system, and also advertise and direct packet flow between intermediate system and end system based on flow requirement.

BACKGROUND OF THE INVENTION

The current way of communication between intermediate system and end system is relying on ARP (address resolution protocol). The ARP sends out a broadcast to all end systems to look for a layer two address of an IP address. This mapping from one IP address to only one MAC address just provides reachable information. This invention will provide more than just reachable information to allow more intelligent forwarding decision to satisfy the service requirement that includes the traffic quality and other policies. In order to scale the service to large number of physical servers (end systems), it would be necessary to have a method and protocol to improve the current way of communication between intermediate system and end system (server) that is using APP protocol, this invention allows one IP address to map to multiple physical servers identified by MAC address, and to provide intelligent selection and forward algorithm to distribute application flow among all the end systems (servers).

SUMMARY OF THE INVENTION

This invention basically will not use the ARP that sends out a broadcast to all end systems to look for a layer two address of an IP address. Instead, the intermediate system will listen to the service information advertised by the servers and relayed by supervisor system and store them into its server table and forward the newly requested traffic to a server that is looked up from this server table. The selection of the target server depends on service congestion advertisement that will advertise the service availability and response time to help the intermediate system to select the less congested server to send the request to. After server accepts the service request, it will advertise the flow routing information. The flow routing information will specify usually itself as the destination (using layer two Ethernet MAC address) for the traffic flow that it is serving. Not just destination address but also the source address and other protocol number in the packet header could be specified as the traffic flow matching criteria. These flow advertisements will be stored in the flow table in the intermediate system in addition to server table.

After the flow is installed by the intermediate system, the later packets that match the flow will be forwarded to the end system that is based on the result of looking up the flow table. The result will indicate which server (represented by a layer two MAC address) to send to for this flow. The flow table will be always looked up first, if the intermediate system could not find a match. The packet will be treated as a new first service request packet that is looking for service. The intermediate will then look up the server table to find one available server to send the request to. Service can be withdrawn and added on the fly, and flow can be terminated through advertisement after it is finished, time out or other policies, but these will be transparent to the end users. All these servers are all sharing the same IP address that allow the client to access like one big server. Any of the protocol number and any other number pool could be centrally controlled by SS (supervisor system) to guarantee the uniqueness of the traffic flow and proper number resource management. The invention features the load balancing with fault tolerance with Service Information and Flow Advertisement Protocols among the intermediate systems and end systems.

The invention also features the service type and flow advertised in a pattern-matching format, which allow intermediate switching system to classify the packet without knowing the application details.

The invention also features the service information advertised by the end system (server) that contains the service attributes of service congestion, capability and others to help the server management in this layer two network.

The invention also features the flow information advertised by the end system (server) that contains the flow attributes of quality of service requirements as a label distribution protocol in a layer two network.

The invention also features the method of allowing multiple physical servers sharing a single IP address in a way that is transparent to the client, through the use of Assigned Numbers Authority protocol with Service Information and Flow advertisement protocol.

The invention also features the use of label (label number is centrally controlled through Assigned Numbers Authority protocol) to differentiate between the packets that are using the none-unique overlap private IP address by adopting the uniquely assigned source label.

This invention will improve the current way of communication between intermediate system and server using ARP protocol. The invention will allow one IP address to map to multiple physical servers identified by layer two address and still can provide uniqueness of communication between each physical server and client.

The system of the present invention includes intermediate system, end system, and supervisor system. The IS (intermediate system) is IP router or switch device that receives traffic from client and forward it to the end system on this layer 2 network and on the other end it also forwards the response traffic from the end system to the client. The ES (end system) could be any kind of servers including HTTP server, FTP server, firewall proxy server, IPSEC tunneling server, Streaming media server, content cache server and NAT (Network Address Translation) server etc. The SS (supervisor system) is a special system that handles the service registration from all the systems on this layer two network. It also replies the request of any new system that looks up the server list for a particular service on this network. It could also runs as an "Assigned Numbers Authority" server for this layer 2 network and also runs as a management agent that manages all the systems registered to it.

Since all the servers could share one IP address, there is a need for centralized controlled to guarantee the uniqueness of the traffic flow classification between the client and the physical server. Assigned Numbers Authority Protocol achieves this. A back up supervisor system can be provided to support redundancy if the primary supervisor system failed. This layer two network could be built by layer two

BRIEF DESCRIPTION OF THE DRAWINGS

FIG. 2(a) is a sequence diagram illustrating service registration sequence of service information protocol of the present invention.

FIG. 2(b) is a sequence diagram illustrating service de-registration sequence of service information protocol of the present invention.

FIG. 4(a) is a sequence diagram illustrating server congestion multicast message of service control advertisement of the present invention.

FIG. 4(b) is a sequence diagram illustrating the triggered server congestion unicast message of service control advertisement of the present invention.

FIG. 4(c) is a sequence diagram illustrating redirect message sequence of service control advertisement of the present invention.

FIG. 5 is a diagram illustrating flow advertisement sequence of the present invention.

FIG. 6 is a diagram illustrating assigned number authority protocol sequence of the present invention.

FIG. 8 is a diagram illustrating label encapsulation in user packet.

FIG. 9 is a diagram illustrating message format with or without VLAN priority.

FIG. 10 is a diagram illustrating protocol message format.

FIG. 11 is a diagram illustrating message format for common message header.

FIG. 12 is a diagram illustrating message format for service registration request.

FIG. 13 is a diagram illustrating message format for services de-registration request.

FIG. 14 is a diagram illustrating message format for service registration acknowledgement.

FIG. 15 is a diagram illustrating message format for service de-registration acknowledgement.

FIG. 23 is a diagram illustrating message format for flow advertisement acknowledgement.

FIG. 24 is a diagram illustrating message format for flow attributes.

FIG. 25 is a diagram illustrating message format for Assigned Number Request.

FIG. 26 is a diagram illustrating message format for Assigned Number Acknowledgement.

FIG. 27 is a diagram illustrating message format for Assigned Number Update Request.

FIG. 28 is a diagram illustrating message format for Assigned Number Update.

FIG. 29 is a diagram illustrating message format for Assigned Number Update Acknowledgement.

DETAILED DESCRIPTION OF THE INVENTION

Figure 1:
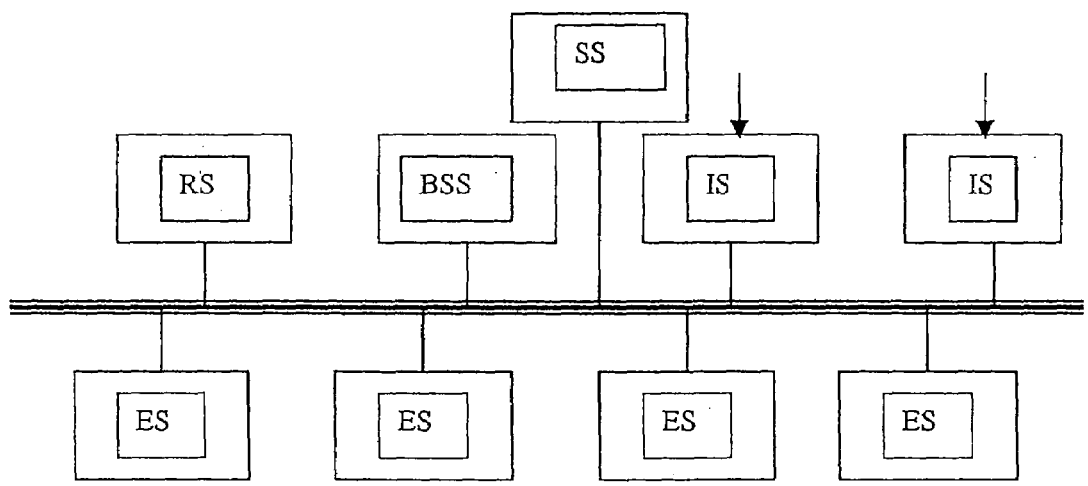
FIG. 1 is a block diagram illustrating a system of the present invention having intermediate system, end system, and supervisor system.

As shown in FIG. 1, the systems of the present invention include intermediate system, end system, and supervisor system. The IS (intermediate system) is IP router or switch kind of device that receives traffic from outside, and forward it to the end system. On the other end, it also forwards the response traffic from the end system to the outside. The ES (end system) could be any kind of servers including HTTP server, FTP server, firewall proxy server, IPSEC tunneling server and NAT (Network Address Translation) server etc. The SS (supervisor system) is a special system that handles the registration from all the systems on this layer two network. It also respond to the requests from any new system that looks up the server list for a particular service on this network. It also runs as an "Assigned Numbers Authority" server for this layer 2 network. It could also runs as a management agent that manages all the systems registered to it. Since all the servers are sharing one IP address, there is a need for centralized controlled to guarantee the uniqueness of the traffic flow between the client and the physical server. A back up supervisor system can be provided to support redundancy if the primary supervisor system failed. This layer two network could be built by layer two switching devices (like Ethernet switches) or physical repeaters (like Ethernet hubs).

A service is usually provided by multiple end systems (servers), an intermediate system will learn these services advertised by the end systems and directs the traffic based on the service information advertisements. If a system is providing proxy service like firewall application proxy, it is both an intermediate system and end system. It acts like a server when it accepts requests from the client and also acts like client when it initiates a request to the application server that actually provides the service. In another aspect, the intermediate system is providing the forwarding service based on flow, service type or destination address.

A service may include both processing and forwarding. A system will try to process the packet first, if it cannot process it, it will try to forward it based on flow, if flow information is not available, then it will look up the service type. The last resort is to forward the packet based only on the destination address. But the processing or forwarding decision also includes also the "drop packet" decision.

Service

A service is described by pattern matching rule, which allows the intermediate system that parses the packet based on these rules to determine a match. Hence the intermediate system does not have to be "application aware" as long as it can execute the pattern matching rule that usually can be done by very fast network processor. The fields to be parsed will sometimes need to include not just the destination, but also the source information for a service. One example is the address translation service that will check both the source address and destination address to determine whether address translation is needed. A more precise definition of service will be defined in the description of message format.

In multicast addresses situations, we use All Supervisors to represent a well-known layer two multicast address for both the primary supervisor system and back up supervisor system, AllServerOfServiceX to represent a layer two multicast address for all the servers that provide the service X, and AllClientOfServiceX to represent a layer two multicast address for all the clients that are interested in the service X.

As shown in FIG. 2(a), a sequence diagram illustrates service registration message sequence of service information protocol of the present invention. When an end-system (server) just comes up, it will send this multicast message to AllSupervisors about the service it provides with its own layer two address and keep-alive interval. The service is specified as pattern matching rules. The (server) end-system should re-transmit until the supervisor system acknowledges its service registration. The acknowledgement by the supervisor system will assign a multicast address to the servers that provide this type of service (i.e. AllServerOfServiceX) as well as the multicast address of all the clients that are interested in this type of service (i.e. AllClientOfServiceX). The supervisor system could also overwrite the keep-alive interval if necessary. The server should acknowledge the supervisor system by sending its first keep-alive message and so on. The service de-registration message allows (server) end-system to withdraw the service it provides. Of course, the (server) end-system also needs to re-transmit until the supervisor system acknowledges its service de-registration.

Figure 3A:
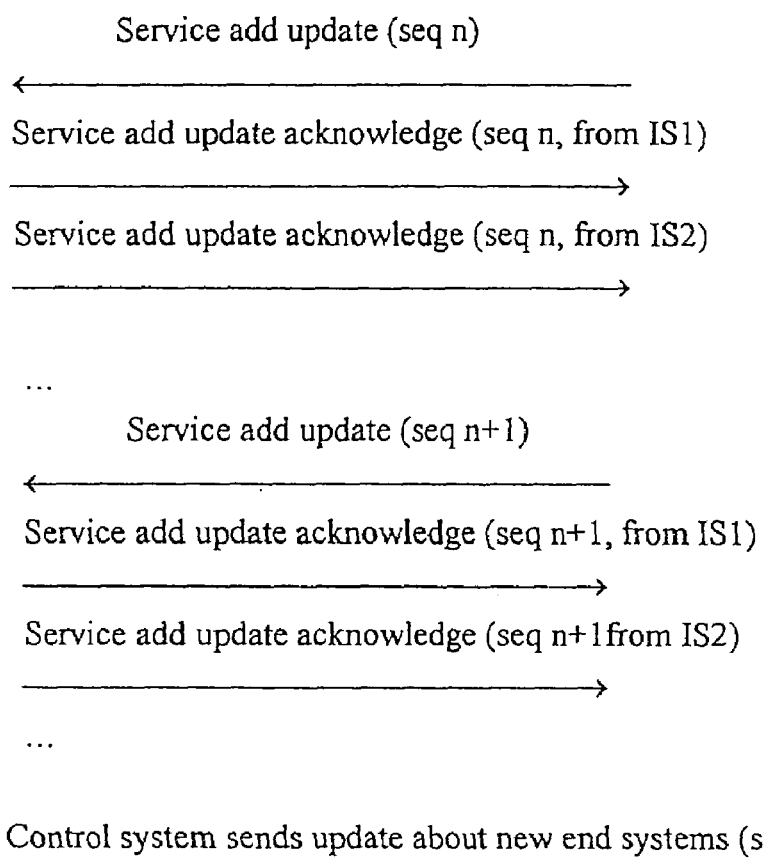
FIGS. 3(a) 3(b) and 3(c) illustrate service addition and deletion update sequence of service information protocol of the present invention.
Figure 3B:

In FIG. 3(a) and (b), if there is any server list change, the supervisor system should send this update multicast message of server addition and deletion list to AllClientOfServiceX. The server change list must fit into one packet to allow each client to acknowledge the update. If there is more than one packet which is split into multiple update messages and waits for all the acknowledgements to come back before the next one is sent.

Figure 3C:
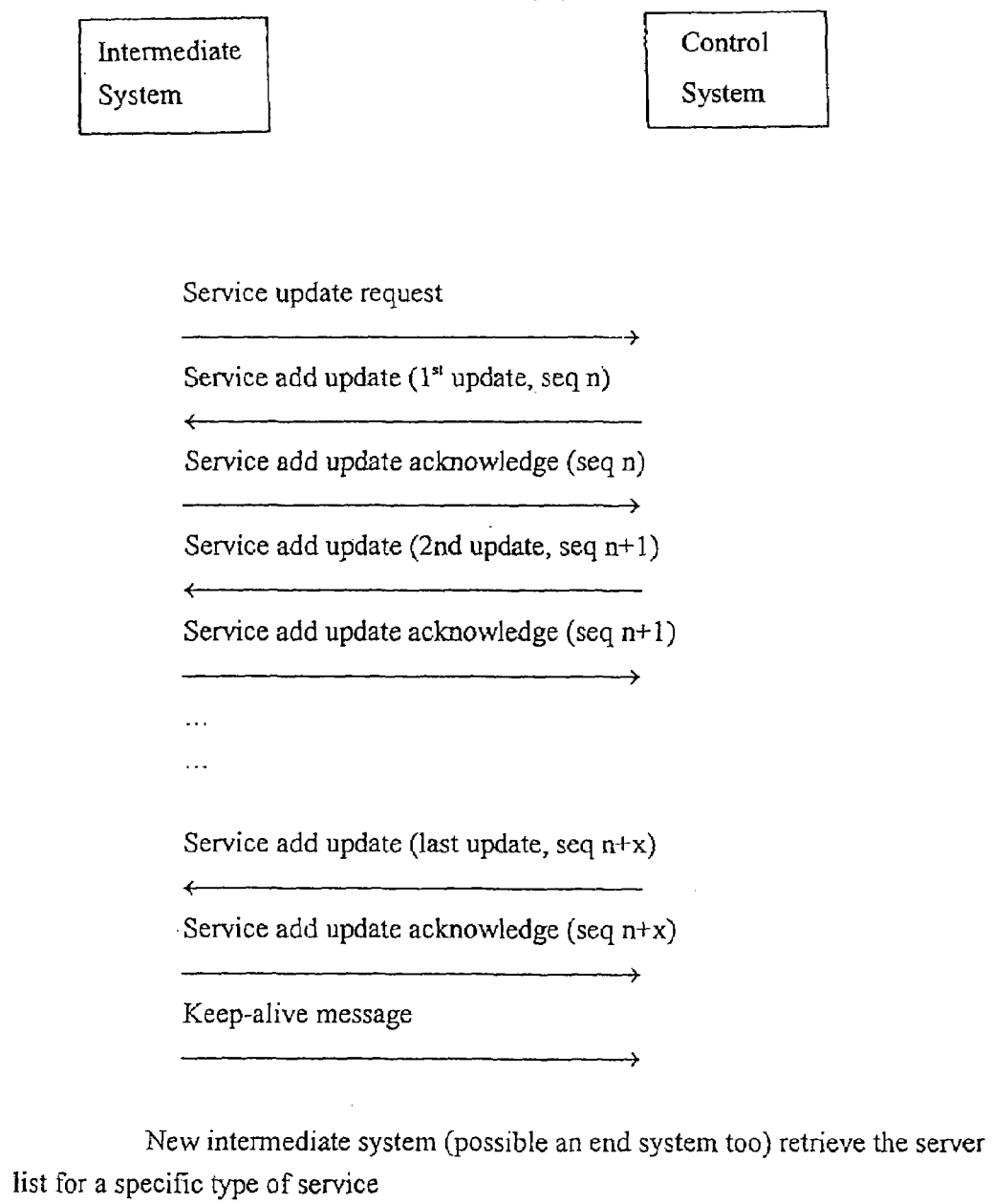
Figure 7:
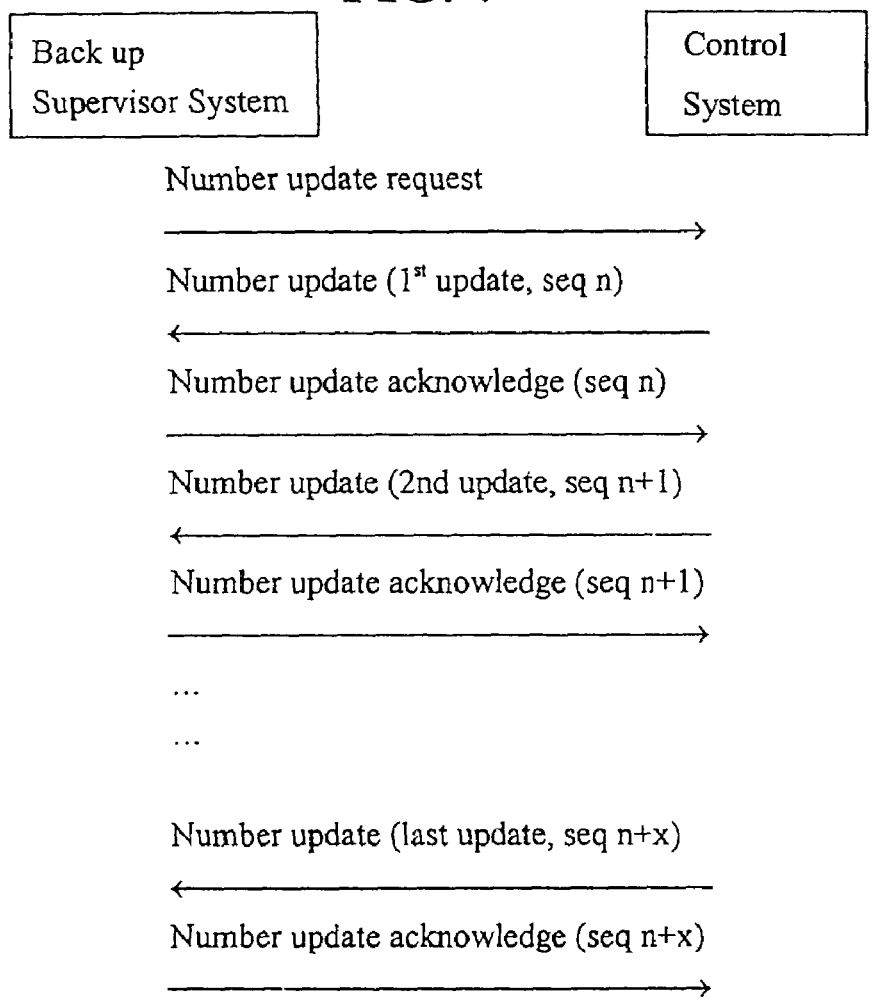
FIG. 7 is the new back up supervisor system to retrieve the assigned number list from primary supervisor system.

In FIG. 3(c), a new (client) intermediate system (possibly an end system too) can send this multicast message to AllSupervisors to ask for the server list for a specific type of service and indicate its own keep-alive interval. The supervisor system should respond with a server update message with the server list for that specific type of service, which was registered to it. If the server list is too long to fit into one packet, the response packet should assign a sequence number and a two bit flag in each packet to indicate it is the init (first) and more packets. Each packet should be acknowledged by the new intermediate system based on the sequence number before the supervisor system can send the next one. The reply from the supervisor system also assigns a multicast address to the clients that are interested in this type of service (i.e. AllClientOfServiceX) as well as the multicast address of all the servers that provide this type of service (i.e. AllServerOfServiceX). The supervisor system could also overwrite the keep-alive interval if necessary. After the last acknowledgement for the server update message, the server should wait no more than one keep-alive-interval to send out its first keep-alive message.

FIG. 4(a) is a sequence diagram illustrating congestion message sequence of service control advertisement of the present invention. When a server is congested and drops the request packet because it cannot take more requests for the service it provides, it should send this multicast message to AllSupervisors and AllClientOfServiceX about the congested service X provided by it. The congestion message will indicate the 'temporary out of service time'. When the other systems received such a congestion message, they should flag the congested server as inactive in its server list for that particular service until the 'out of service time' status expires.

When a server is in 'temporary out of service' state for new request, and it receives a new request for that service, it must respond a unicast service congestion advertisement message to the requesting node. This is illustrated in FIG. 4(b). It optionally may also redirect (forward as is) the request to other server who can also provide the same service.

FIG. 4(c) is a sequence diagram illustrating redirect message sequence of service control advertisement of the present invention. When a server tries to respond to the request, it picks up one router to send to from its (routing) server list, it may not choose the best next hop router, but this message (works similar to an ICMP message) can redirect the server to pick up a better router. A server could also use this message to redirect the user request to other better server node based on the service configuration or other requirement.

Flow

A flow is a description of a traffic flow from source to destination. It could be same as a TCP connection that specifies the source IP address, destination IP address, source TCP port and destination port, but it also can be specified just by source IP address and destination IP address and destination TCP port without source TCP port. The latter case is particularly important to maintain a persistent connection between the client and server. The specification of a flow is totally determined by the server, i.e. dependent server application requirement. In this invention, the server that accepts the connection request will advertise the flow information to intermediate system to instruct the intermediate system how to forward later packets that match the flow specification. A flow could be established from end system to intermediate system, and can also be extended and established from the intermediate system further to its next hop upstream intermediate system neighbor. A flow is also described by pattern matching rule, which allows the intermediate system that parses the packet based on these rules to determine a match. Hence the intermediate system does not have to be "application flow aware" as long as it can execute the pattern matching rule that usually can be done by very fast network processor. A flow is unidirectional. The flow from intermediate system to server is advertised by server, with the flow-matching, rule that is identified by a flow label assigned by the advertising server. The flow from server to intermediate system is still advertised by server, but the flow label is assigned by the intermediate system in the flow acknowledgement packet. A more precise definition of flow will be defined in the description of message format.

FIG. 8 represents label encapsulation in user packet of the present invention. The user traffic in this layer two network will be inserted with four-byte value with label information. If the packet matches a flow, the flow label will be inserted into a normal Ethernet frame by either intermediate system or a server. If the packet doesn't match any flow yet, the four-byte value will be filled with a source label that is used to indicate the source of the packet. Two new frame types will be needed to uniquely determine the frame format. One is for flow label frame; the other is for source label frame.

Optionally, the priority only VLAN tag frame might be inserted before the label.

The frame formats with or without VLAN priority are shown in FIG. 9. The label can also be used to differentiate the private address. One example of this source label is to embed the VPN identification or the incoming router device ID and interface number. For the packet using none-unique private IP address, the source label can be used to uniquely classify a flow. The VPN identification could be configured to associate to an interface of a system. Different VPN identification number in the packet can differentiate packets (from different interfaces) that are using the same source private IP address to a the same destination IP address.

In flow advertisement protocol, the (server) end-system should send this multicast message to AllClientOfServiceX about the flow with attributes and actions it accepted with its own layer two address. The flow is specified in pattern matching rules. The (server) end-system should re-transmit until original requesting intermediate system acknowledges its flow advertisement. The flow attributes will be specified in the flow advertisement. A static user configured flow is also possible to allow the flow based policy routing.

FIG. 5 is a diagram illustrating advertisement sequence of the present invention. The flow advertised by the end system (server) would multicast to AllClientOfServiceX. But the advertised message will indicate the original requesting intermediate system. Those intermediate systems are not the original requesting intermediate system, which may store this flow information into their flow table or process this flow information based on their own implementation and policies. This advertisement does not require acknowledgement from each of the interested clients except the original requesting intermediate system to avoid too much flow acknowledgement traffic.

Assigned Numbers

For assigned numbers, within this layer two network, there are numerous parameters, such as IP addresses, under same IP address the TCP or UDP port number, certain fields in layer three to layer seven header or content and many others need to be controlled and managed. Some of them are required to guarantee the uniqueness of a traffic flow; others are common resources that needs be centrally controlled. The sharing of one IP address for many servers that provide the same service requires that the values used in certain parameter fields in the packet header and content to be assigned uniquely. It is the task of the Assigned Numbers Authority server to make those unique number assignments as requested and also maintain a registry of the currently Assigned values.

In assigned numbers authority protocol, the end system or intermediate send this multicast message to All Supervisors to request to lease one or a range of certain parameters to be used. The supervisor system replies and grants the range of the number from its pool for that specific parameter with the lease time equal or smaller than the requested least time. When the requesting system is detected to be dead by supervisor system, those number granted to it will be withdrawn back to the pool by the supervisor system.

Synchronization of the Registry of the Currently Assigned and Unassigned Numbers Also, to synchronize the registry of the currently assigned and unassigned values between the backup supervisor system and primary supervisor system, the back up supervisor system can send a unicast request to primary supervisor system about the assigned and unassigned numbers for a specific number type. The primary supervisor system should response with a number update message with the assigned and unassigned numbers for that specific type of number. If the type of number is too many to fit in one packet, the response packet should assign a sequence number and a flag in each packet to indicate it's the first, middle or last packet. Each packet should be acknowledged by the new back up supervisor system based on the sequence number before the primary supervisor system can send next one.

Supervisor and Back Up Supervisor System Selection Process

In back up supervisor system redundancy support, when a supervisor system (whether back up or not) comes up, it always tries to inquire the back up supervisor system from the existing supervisor system by sending a multicast service update request message to All Supervisors. If there is any existing primary supervisor system that replies this service update request without a back up supervisor system available, then the new supervisor system will become a back up supervisor system, and it will synchronize the server table with primary supervisor system through Server Update Message Protocol. Also, the back up supervisor system will synchronize numbers that are assigned and unassigned by the primary supervisor system through Number Update Message protocol. After the last number update message was acknowledged, the back up supervisor system will periodically send inquiry unicast request for primary supervisor system and listen all the messages sent to the AllSupervisors multicast address. If there exists a back up supervisor system, it will periodically send out the inquiry to try to become a back up supervisor system until the existing back up supervisor system actually disappeared. If there is no response for the service update request for an (dead) interval (3 times of service inquire intervals), then the new supervisor system will become the primary supervisor system. (But there is no back up supervisor system.) If the new supervisor system received an inquiry request about the back up supervisor system to primary supervisor system during the (dead) interval with the MAC address of received message is lower than its own MAC address, then the new supervisor system itself will still become primary supervisor system at the end of (dead) interval. If the new supervisor system received an inquiry request to primary supervisor system message during the (dead) interval with the MAC address of received message is higher than its own MAC address, then the system with highest MAC address will be the primary supervisor system and the second highest MAC address will become the back up supervisor system. After the primary supervisor system is found or elected, the back Up supervisor system will periodically send inquiry request for primary supervisor system, if primary supervisor system received the request, it will refresh back up supervisor system age timer and replies the request and so on. If the primary supervisor system doesn't receive the back up request at end of age time, it will remove the back up supervisor system and may send a SNMP trap. On the other hand, if there is no response for an (dead) interval (3 times of service inquire intervals), then the back up supervisor system will become the primary supervisor system.

Protocol Message Format

FIG. 10 is a diagram illustrating protocol message format of the present invention. The packet could be carried by Ethernet frame or carried by IP or UDP.

We will find a unique type for the frame type.

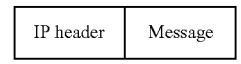

We will find a unique protocol type in IP header.

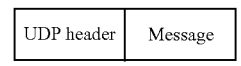

We will find a unique port number in UDP header.

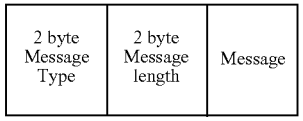

FIG. 11 is a diagram illustrating common message header format of the present invention.

The message type will have
1000: Service Registration Request
1001: Service Registration Acknowledgement
1002: Service De-registration Request
1003: Service De-registration Acknowledgement
1100: Service Update Request
1101: Service Add Update
1102: Service Add Update Acknowledgement
1103: Service Delete Update
1104: Service Delete Update Acknowledgement
1200: Service Control Advertisement
1300: Flow Advertisement
1301: Flow Advertisement Acknowledgement
1400: Assigned Number Request
1401: Assigned Number Acknowledgement
1500: Assigned Number Update Request
1501: Assigned Number Update
1502: Assigned Number Update Acknowledgement For the keep-alive message, a system periodically sends Service Control Advertisement multicast message to AllClientOfServiceX with keep-alive interval service attribute to refresh its age time in supervisor system (also a client of service X) and all the clients of the service X. The current response time will also be attached as the metric as the loading factor to let client (IS) select the less congested server.

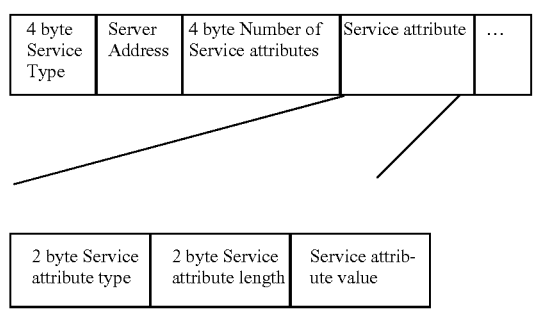

Server address is 8 byte field, the first two bytes determine it's MAC address or IP address. 00 00 is MAC, 00 01 is IP.

Keep-alive interval and Server current Response time are two of the service attribute types, 1 for Keep-alive interval, 2 Server current Response time.

The keep-alive interval is the time interval that the system will send the periodical keep-alive message. Server current Response time is the current time difference between the request packets (ex. HTTP request) entry time stamp by the Ethernet driver and the time stamp the response packet sent to the wire. The current time difference should be recorded by sending drivers and averaged within the keep-alive interval.

Supervisor system may calculate the average response time based on each server's latest current response time within the interval that the supervisor system sent to its parent supervisor system.

FIG. 12 is a diagram illustrating message format for service registration request of the present invention.

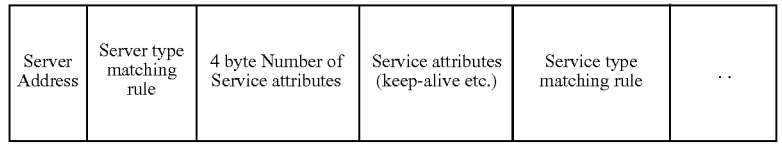

Service type matching rule is variable length that is defined in later section. Server address is 8 byte field, the first two bytes determine it's MAC address or IP address. 00 00 is MAC, 00 01 is IP.

FIG. 13 is the message format for service de-registration request, the format is as following:

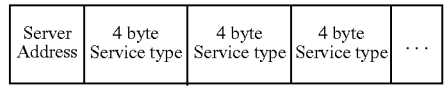

FIG. 14 is a diagram illustrating message format for service registration acknowledgement of the present invention.

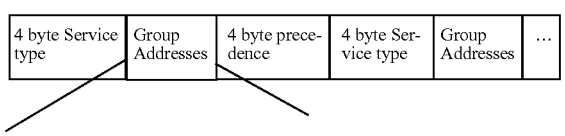

Sever address is 8 byte field, the first two bytes determine it's MAC address or
IP address. 00 00 is MAC, 00 01 is IP unicast or multicast.

The server unicast address is the server address that registers the service. The server multicast address is the multicast address for all the servers that are serving the registered service assigned by supervisor system. The client multicast address is the multicast address for all the clients that are interested in the registered service also assigned by supervisor system. Precedence is used for service matching tie breaking if there are two or more matching service rules. The intermediate system's destination only forwarding service should have lower precedence than the others. This means the searching the routing table for a next hop node has lower priority than searching the flow table and (processing) server table. FIG. 15 is the message format for service de-registration acknowledge, the format is as following:

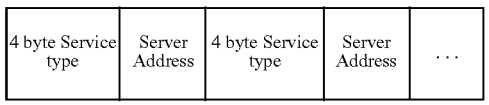

Figure 16:
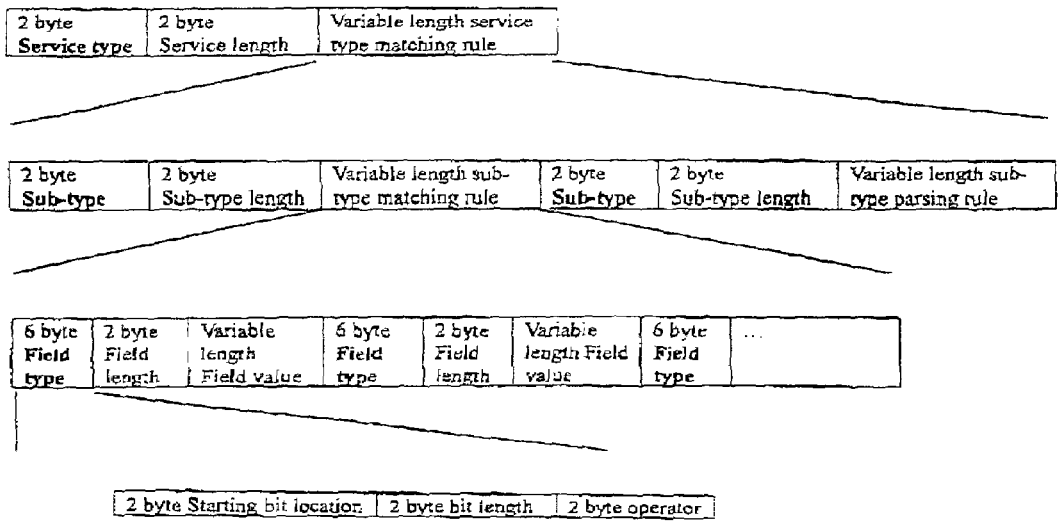
FIG. 16 is a diagram illustrating message format for service type matching rule.

FIG. 16 is a diagram illustrating message format for service type matching rule of the present invention. In service classification, the format to describe a service type in pattern matching way is defined in FIG. 11. A service type is uniquely classified by a packet-parsing rule. If somehow there are multiple packet-parsing rules for the same service type, it is still classified as a different service type although the server that provides the service will serve them all. The parsing rule for a specific service type consists of a serial of pattern matching fields. The related fields especially in the same layer's header can be grouped together as a sub-type. The most significant bit in the service type or sub-type will indicate if this is the final field or an intermediate sub-type or type. The bit location is starting from the beginning of the field's associated layer header and the hierarchy could go all the way up to layer 7. The FIG. 16 message format for service type matching rule is as following:

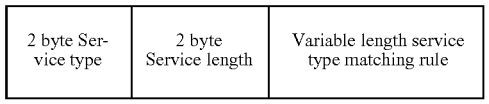

Note that the unit of length is in number of bytes. The service type-matching rule consists of multiple level and multiple fields to be simultaneously matched. These pattern matching can be executed much faster by the pattern matching network processor than the normal procedure oriented CPU. The starting bit location is the offset from the beginning, of the packet header that is deduced by the type or sub-type. The operator consists of ">", "<", ">=", "<=", "=" and "!=". The unit of length of the field value is counted in bytes, the field value could have unused leading zero bits. Same starting bit location and bit length can appear more than once if the operator is different.

Figure 17:
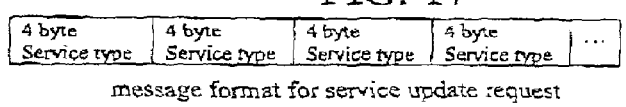
FIG. 17 is a diagram illustrating message format for service update request.

In the FIG. 17 message format for service update request, as shown in the following:

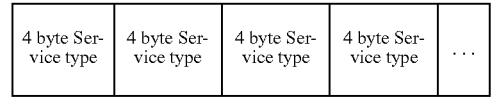

The replied message will be the services add update message.

Figure 18:
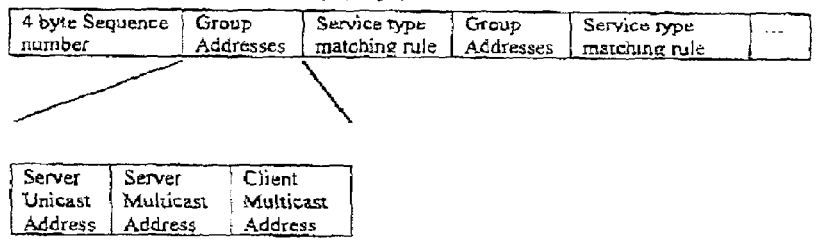
FIG. 18 is a diagram illustrating message format for service deletion update.

FIG. 18 is a diagram illustrating message format for service addition update of the present invention.

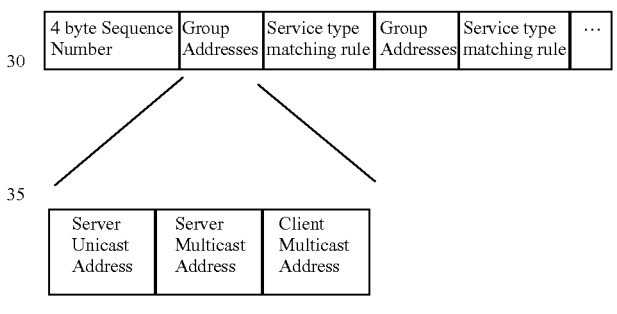

The highest 2 bits of sequence number will indicate the first, middle or last update packet. Bit 31, 30 of sequence number is init and more bits.

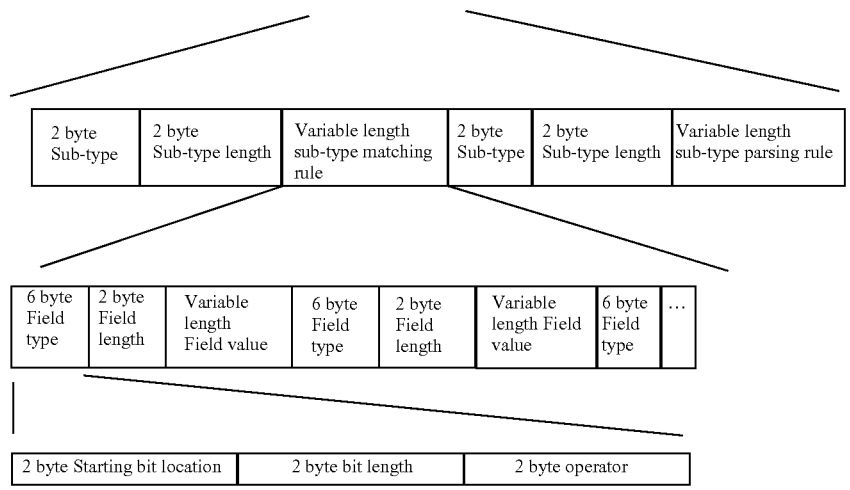

| Init | more | |
|---|---|---|
| 1 | 0 | single packet |
| 1 | 1 | first |
| 0 | 1 | middle |
| 0 | 0 | last |

Figure 19:
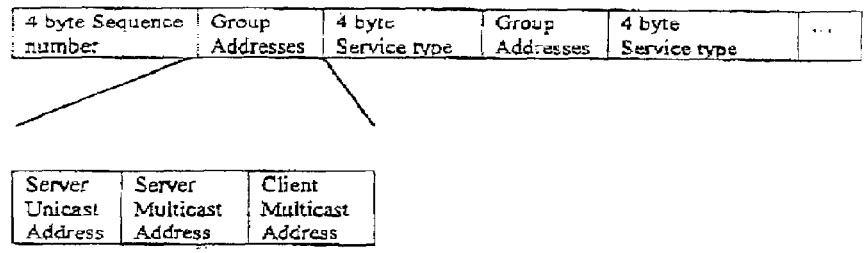
FIG. 19 is a diagram illustrating message format for service delete update.

FIG. 19 is a diagram illustrating message format for service delete update of the present invention.

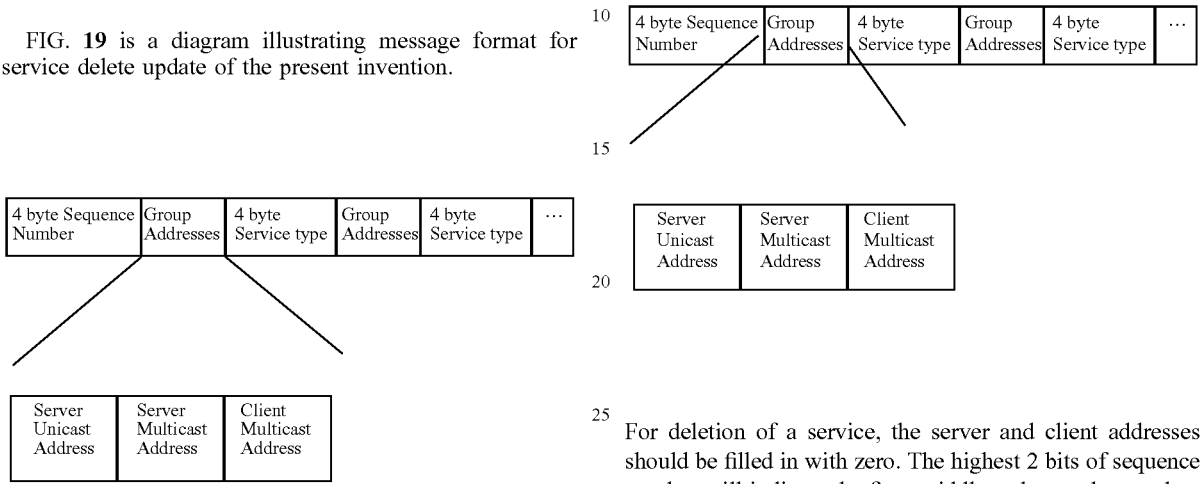

The highest 2 bits of sequence number will indicate the first, middle or last update packet. Bit 31, 30 of sequence number is init and more bits.

| Init | more | |
|---|---|---|
| 1 | 0 | single packet |
| 1 | 1 | first |
| 0 | 1 | middle |
| 0 | 0 | last |

Figure 20:
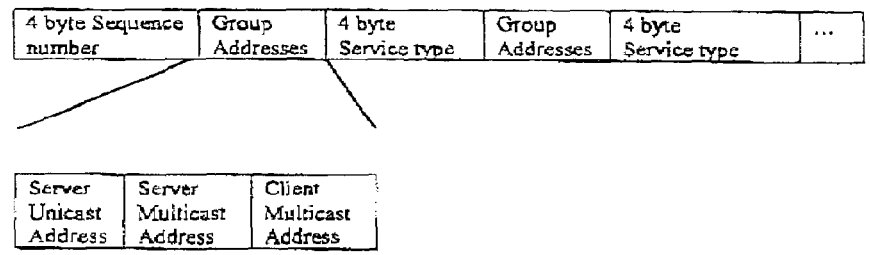
FIG. 20 is a diagram illustrating message format for service update acknowledgement.

FIG. 20 is a diagram illustrating message format for service updates acknowledge of the present invention. This is the acknowledgement for both add or delete service update.

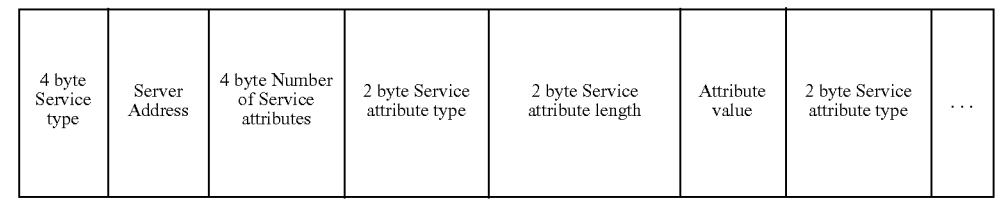

For deletion of a service, the server and client addresses should be filled in with zero. The highest 2 bits of sequence number will indicate the first, middle or last update packet. Bit 31, 30 of sequence number is init and more bits.

| Init | more | |
|---|---|---|
| 1 | 0 | single packet |
| 1 | 1 | first |
| 0 | 1 | middle |
| 0 | 0 | last |

Figure 21:
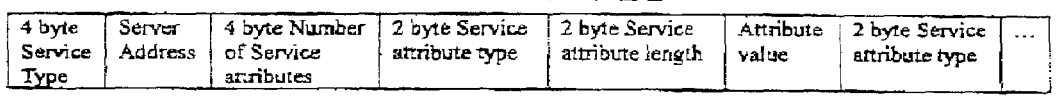
FIG. 21 is a diagram illustrating message format for service control advertisement.

FIG. 21 is a diagram illustrating message format for service control advertisement of the present invention.

| 4 byte Service type | Server Address | 4 byte Number of Service attributes | 2 byte Service attribute type | 2 byte Service attribute length | Attribute value | 2 byte Service attribute type | ... |
|---|---|---|---|---|---|---|---|

Two more service attribute types for service control message,
3 for "temporary out of service" by a congested system;
4 for "redirect" the packet to other better system by intermediate system or server.

| Temporary Out of service | Length | Out of service time |
|---|---|---|

| Redirect | Length | Server addresses |
|---|---|---|

Length will determine the length of all server addresses.

Server addresses are all the possible servers that can be redirected.

Figure 22:
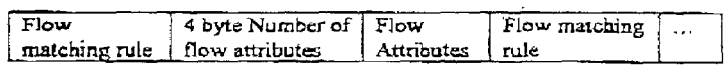
FIG. 22 is a diagram illustrating message format for flow advertisement.

FIG. 22 is a diagram illustrating message format for flow advertisement of the present invention.

| Flow matching rule | 4 byte Number of flow attributes | Flow Attributes | Flow matching rule | ... |
|---|---|---|---|---|

FIG. 23 is a diagram illustrating message format for flow advertisement acknowledgement of the present invention.

| Flow label | 4 byte Number of flow attributes | Flow Attributes | Flow label | 4 byte Number of flow attributes | Flow Attributes | Flow label | ... |
|---|---|---|---|---|---|---|---|

The flow label is 4 bytes. The intermediate system could acknowledge the flow with a flow attribute to overwrite a new flow label. One of the flow attributes is action attribute; one of the action attribute values is to withdraw the flow. The intermediate system could acknowledge the flow with a flow attribute to overwrite a new flow label.

The format to describe a flow is defined in FIG. 18. A flow is uniquely classified by a packet-parsing rule and will be identified by a 32-bit label. The range of the label assigned to a server is going through the Assigned Number Authority Protocol. This makes the flow label unique across the whole layer two network. If somehow there are multiple packet-parsing rules for the same flow, it is still classified as a different flow although the intermediate system that directs them all to the same end system or possible next intermediate system. The parsing rule for a specific flow consists of a serial of pattern matching fields. The related fields especially in the same layer's header can be grouped together as a sub-type. The most significant bit in the service type or sub-type will indicate if this is the final field or an intermediate sub-type or type. The bit location is starting from the beginning of the field's associated layer header and the hierarchy could go all the way up to layer 7.

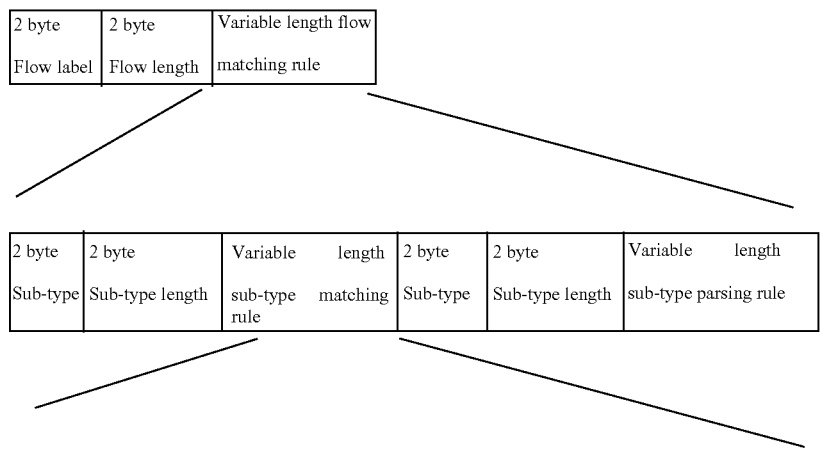

-continued

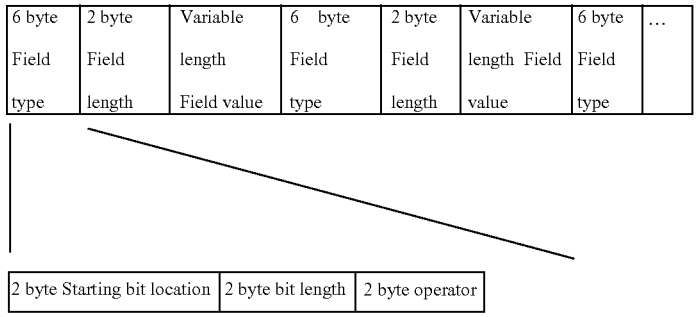

Note that the unit of length is in number of bytes.

The flow-matching rule consists of multiple levels and multiple fields to be simultaneously matched. These pattern matching can also be executed much faster by the pattern matching network processor than the normal procedure oriented CPU. The starting bit location is the offset from the beginning of the packet header that is deduced by the type or sub-type. The operator consists of ">", "<", ">=", "<=", "==" and "!=".

The unit of length of the field value is counted in bytes, the field value could have unused leading zero bits. Same starting bit location and bit length can appear more than once if the operator is different. In flow attribute, flow could have attributes of traffic engineering requirements, quality, priority, label of the MPLS and other flow oriented information.

FIG. 24 Message format for flow attribute

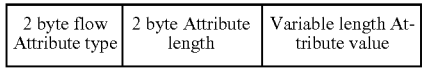

The most significant bit in the Attribute type will indicate if this is the last attribute.

Flow Attribute—Action

The attribute type 1 is action attribute.

The flow-action attribute consists of "permit". "deny". "MPLS label insertion", "MPLS label removal", "flow withdraw" and any other policy configuration matching action items.

Flow Attribute—label Value

The attribute type 2 is label value attribute.

This could be used by intermediate system to overwrite the label value for an incoming flow advertised by server.

Flow Attribute—Designated System

The attribute type 3 is to identify the designated system that should acknowledge this flow advertisement.

Flow Attribute—Bandwidth and Maximum Delay

The attribute type 4 is to specify the bandwidth requirement and maximum delay of this flow.

Zero is reserved for best effort traffic.

Flow Attribute—DiffServ and TOS (Type Of Service) modification

The attribute type 5 is to specify the new value for the TOS or DiffServ in the IP packet header.

FIG. 25 Message format for Assigned Number Request

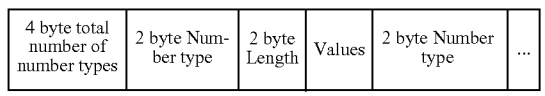

Values contain the starting number and the length of the number requested etc.

FIG. 26 Message format for Assigned Number Acknowledge

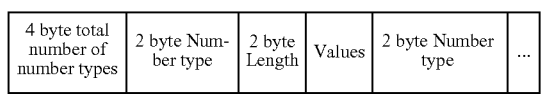

Values contain the starting number and the length of the number granted etc.

FIG. 27 Message format for Assigned Number Update Request

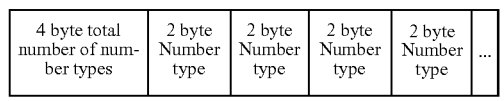

FIG. 28 Message format for Assigned Number Update

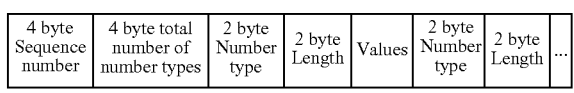

The highest 2 bits of sequence number will indicate the first, middle or last update packet. Bit 31, 30 of sequence number is init and more bits.

| Init | more | |
|------|------|------|
| 1 | 0 | single packet |
| 1 | 1 | first |
| 0 | 1 | middle |
| 0 | 0 | last |

FIG. 29 Message format for Assigned Number Update Acknowledge

| 4 byte Sequence number | 4 byte total number of number types | 2 byte Number type | 2 byte Length | Values | 2 byte Number type | 2 byte Length | ... |
|---|---|---|---|---|---|---|---|

The highest 2 bits of sequence number will indicate the first, middle or last update packet. Bit 31, 30 of sequence number is init and more bits.

| Init | more | |
|---|---|---|
| 1 | 0 | single packet |
| 1 | 1 | first |
| 0 | 1 | middle |
| 0 | 0 | last |

The present invention has been described hitherto with exemplary preferred embodiments. However, it is to be understood that the scope of the present invention need not be limited to the disclosed preferred embodiments. On the contrary, it is intended to cover various modifications and similar arrangements with the scope defined in the following appended claims. The scope of the claims should be accorded the broadest interpretation so as to encompass all such modifications and similar arrangements.

What is claimed is:

1. A system for managing broadband IP services in a layer two broadcast network comprising:

at least one intermediate system receiving traffic from outside and forwarding the traffic to at least one end system and also forwarding the response traffic from the at least one end system to the outside, wherein the at least one intermediate system forwards a service request packet to an available one of the at least one end system that the intermediate system learned about from service advertisements by the at least one end system;

the one of the at least one end system advertising and providing service information on the layer two network, wherein if the one of the at least one end system determines to instruct another one of the at least one intermediate system to forward certain traffic from a certain source to another one of the at least one end system, the one of the at least one end system can advertise flow information to the another one of the at least one intermediate system, and wherein the service information is advertised by each of the at least one end system on the layer two network, the at least one intermediate system always forwards the packet based on the flow that is advertised by the one of the at least one end system, and each of the at least one end system can be added on the fly to share the load and gracefully shut down on the fly without interrupting other systems on the network and affecting service of the other systems; and at least one control system handling the registration from all the systems on this layer two network, responding to a request of any new system that looks for a server list for a particular service on this network, running as an Assigned Numbers Authority server for this layer two network, and running as a management agent that manages all the systems registered to the at least one control system.

2. A system for managing broadband IP services in a layer two broadcast network comprising:

at least one intermediate system listening to service information advertised by at least one end system and relayed by at least one control system, storing the at least one end system and the at least one control system into a server table of the at least one intermediate system, storing the advertisement in a flow table in addition to the server table, forwarding new requested traffic to one of the at least one end system looked up from this server table, forwarding a packet based on the flow that is advertised by the at least one end system, and receiving traffic from outside and forwarding the traffic to at least one end system and also forwarding the response traffic from the at least one end system to the outside, wherein the at least one intermediate system forwards a service request packet to an available one of the at least one end system that the intermediate system learned about from service advertisements by the at least one end system, and if the at least one end system determines to instruct the at least one intermediate system to forward certain traffic from a certain source to the at least one end system, the at least one system can advertise the flow information to the at least one intermediate system;

the one of the at least one end system advertising and providing service information, which contains operations of registration of services by the at least one end system, service congestion status and a server list for a particular service, on the layer two network, wherein if the one of the at least one end system determines to instruct another one of the at least one intermediate system to forward certain traffic from the certain source to another one of the at least one end system, the one of the at least one end system can advertise flow information to the another one of the at least one intermediate system, and wherein the service information is advertised by each of the at least one end system on the layer two network, the at least one intermediate system always forwards the packet based on the flow that is advertised by the one of the at least one end system, and each of the at least one end system can be added on the fly to share the load and gracefully shut down on the fly without interrupting other systems on the network and affecting service of the other systems; and the at least one control system handling the registration from all the systems on this layer two network, responding to a request of any new system that looks for the server list for a particular service on this network, running as an Assigned Numbers Authority server for this layer two network, and running as a management agent that manages all the systems registered to the at least one control system.

3. The system of claim 1 or 2, wherein the flow includes an established TCP connection or any packets matched to an advertised flow, wherein for packets that do not match any advertised flow, the service table will be looked up and one of the said at least one end system will be picked up based on a loading metric, and wherein both a service and a flow classification are specified in pattern matching rules that match packets to the advertised flow to allow faster execution by pattern-matching network processors.

4. The system of claim 1 or 2, wherein the flow advertisement contains flow attributes that could contain quality of service requirements to support real time application, and a flow advertisement contains also the flow attribute that could insert or delete a label or tag or modify a type of service and priority within a packet header to support multiple protocol label switching, DiffServ and 802.1 priority.

5. The system of claim 1 or 2, wherein the Assigned Numbers Authority protocol manages all the numbers that are shared by these servers that work together as one logical IP entity on this network, and, the service information, flow advertisement and Assigned Numbers Authority protocol together also allows the at least one end system to load-balanced serve a service like one logical end system.

6. The system of claim 1 or 2, wherein the at least one intermediate system is on an IP router.

7. The system of claim 1 or 2, wherein the at least one intermediate system is a switch-type device.

8. The system of claim 1 or 2, wherein the at least one end system is an HTTP server.

9. The system of claim 1 or 2, wherein the at least one end system is an FTP server.

10. The system of claim 1 or 2, wherein the at least one end system is a firewall proxy server.

11. The system of claim 1 or 2, wherein the at least one end system is an IPSEC tunneling server.

12. The system of claim 1 or 2, wherein the at least one end system is a Network Address Translation server.

13. A method for managing broadband IP services in a layer two broadcast network including at least one end system, at least one intermediate system, and at least one control system, comprising the steps of:

advertising service information by the at least one end system;

relaying the service information by the at least one control system;

listening to the service information by the at least one intermediate system;

storing the at least one end system and the at least one control system into a server table of the at least one intermediate system by the at least one intermediate system;

storing the advertisement in a flow table in addition to the server table by the at least one intermediate system;

forwarding the newly requested traffic to one of the at least one end system looked up from this server table by the at least one intermediate system;

forwarding a packet based on a flow that is advertised by the at least one end system to the at least one intermediate system; and receiving traffic from outside and forwarding the traffic received from outside to the at least one end system and also forwarding response traffic from the at least one end system to the outside by the at least one intermediate system.

14. The method claim 13, wherein a service and flow classification are specified in pattern matching rules that match packets to an advertised flow to allow faster execution by pattern-matching network processors.

15. The method claim 13, wherein service information contains operations of registration of services by servers, service congestion status and a server list for a particular service, the flow advertisement contains flow attributes that could contain quality of service requirements to support real time application, and the flow advertisement contains also a flow attribute that could insert or delete a label or tag or modify a type of service and priority with a packet header to support multiple protocol label switching, DiffServ and 802.1 priority.

* * * * *